United States Patent
Wong et al.

(10) Patent No.: US 11,667,771 B2
(45) Date of Patent: Jun. 6, 2023

(54) ELASTOMERIC ARTICLE

(71) Applicant: TOP GLOVE INTERNATIONAL SDN. BHD., Klang (MY)

(72) Inventors: Chong Ban Wong, Klang (MY); Keuw Wei Lim, Klang (MY); Chee Yang Teh, Klang (MY); Chun Fah Mok, Klang (MY)

(73) Assignee: TOP GLOVE INTERNATIONAL SDN. BHD., Selangor (MY)

( * ) Notice: Subject to any disclaimer, the term of this patent is extended or adjusted under 35 U.S.C. 154(b) by 58 days.

(21) Appl. No.: 17/035,506

(22) Filed: Sep. 28, 2020

(65) Prior Publication Data

US 2021/0095104 A1 Apr. 1, 2021

(30) Foreign Application Priority Data

Sep. 30, 2019 (MY) .............................. PI2019005747

(51) Int. Cl.
*C08L 9/02* (2006.01)
*C08L 31/04* (2006.01)

(52) U.S. Cl.
CPC .................. *C08L 9/02* (2013.01); *C08L 31/04* (2013.01); *C08L 2207/04* (2013.01)

(58) Field of Classification Search
CPC .... C08L 9/02; C08L 31/04; C08L 9/10; C08F 218/08
See application file for complete search history.

(56) References Cited

U.S. PATENT DOCUMENTS

| | | | |
|---|---|---|---|
| 5,352,739 A | 10/1994 | Arjunan | |
| 9,752,022 B2 | 9/2017 | Shih et al. | |
| 9,944,781 B2 | 4/2018 | Hough et al. | |
| 10,066,078 B2 | 9/2018 | Magg et al. | |
| 2006/0270783 A1 | 11/2006 | Beck | |
| 2016/0159992 A1* | 6/2016 | Foo | C08L 47/00 428/480 |
| 2017/0253731 A1* | 9/2017 | Vielsack | C08F 255/02 |
| 2021/0095105 A1* | 4/2021 | Ban | C08L 9/04 |

FOREIGN PATENT DOCUMENTS

| | | | |
|---|---|---|---|
| AU | 2017387146 A | | 7/2018 |
| CN | 106188694 A | * | 12/2016 |
| WO | WO 2015/006806 A1 | | 1/2015 |

OTHER PUBLICATIONS

Alex M. Henderson, "Ethylene-Vinyl Acetate (EVA) Copolylmers: A General Review," 9 IEEE Electrical Insulation Magazine, Jan./Feb. 1993, pp. 30-38.*
Hans-Wilhelm Engels et al., "Rubber, 9. Chemicals and Additives," in Ullmann's Encyclopedia of Industrial Chemistry, published online 2011, 66 pages.*
Hazwani Syaza Ahmad et al., "Ethylene Vinyl Acetate as Compatibilizer on Cure Characteristics and Mechanical Properties of (Natural Rubber)/(Recycled Acrylonitrile-Butadiene Rubber) Blends," Journal of Vinyl & Additive Technology, 2017, pp. 135-141.*
English language machine translation of CN-106188694-A, performed on Espacenet Jun. 30, 2022, 8 pages.*
English language abstractor of CN-106188694-A, from Espacenet, downloaded on Jun. 30, 2022, 1 page.*
MY PI2019005747 Search Report dated Jun. 22, 2022.

* cited by examiner

*Primary Examiner* — Angela C Scott
(74) *Attorney, Agent, or Firm* — Alston & Bird LLP

(57) ABSTRACT

An elastomeric formulation comprising elastomers, accelerator, antifoaming agent, antioxidant, crosslinker, colouring agent, surfactant, filler, pH adjuster and dispersing medium, wherein the elastomeric formulation has a total solid content ranging between 5% by weight to 40% by weight. Further, the present invention discloses a method of preparing an elastomeric formulation to manufacture hybrid elastomeric glove, wherein the method comprises the steps of blending Elastomer A with Elastomer B to produce hybrid elastomer and stirring the hybrid elastomer, adding while stirring accelerator, antifoaming agent, antioxidant, crosslinker, colouring agent, surfactant and filler one after another with no particular order and followed by pH adjuster into the hybrid elastomer to produce elastomeric formulation and stirring the elastomeric formulation continuously and allowing the elastomeric formulation to mature, wherein total solid content of the elastomeric formulation is adjusted to be between 5% by weight to 40% by weight by way of addition of dispersing medium into the elastomeric formulation and wherein pH range of the elastomeric formulation is adjusted to be between 9 to 11.

12 Claims, No Drawings

ELASTOMERIC ARTICLE

CROSS-REFERENCE TO RELATED APPLICATION

This application which claims priority to Malaysia Patent Application No. PI2019005747 filed on Sep. 30, 2019 incorporated by reference in its entirety for all purposes.

FIELD OF THE INVENTION

The present invention relates to an elastomeric formulation and article manufactured therefrom, in particular the present invention relates to an elastomeric formulation that is prepared from a blend of two elastomers which is subsequently used to prepare hybrid elastomeric product such as but not limited to a glove with enhanced physical property.

BACKGROUND OF THE INVENTION

In food industries, gloves are introduced to protect the food from the user to prevent contamination. Hence, glove selection is rather critical when dealing with food handling. Several factors are considered before allowing a set of gloves to be used in the food industries, particularly but not limited to the gloves having appropriate durability and passing migration tests set by a regulatory body.

Acrylonitrile butadiene rubber (NBR) gloves are developed to be used in the food industry for having suitable characteristics such as but not limited to good dexterity, good puncture resistance and provide an alternative solution for users who are allergic to natural rubber latex. Yet, the NBR glove exhibits setbacks such as but not limited to wearing out easily due to durability issue, as well as being cost ineffective (i.e. in view of choice of material).

Having said the above, it is apparent that existing elastomeric glove in the food industry, particularly NBR glove has its own disadvantages. As such, there is a need to identify a suitable elastomeric formulation to produce a glove that solves both the cost (i.e. in view of choice of material) and the durability issues, as well as is able to pass migration tests set by the appropriate regulatory body to qualify the usage in the food industry.

SUMMARY OF THE INVENTION

The present invention relates to an elastomeric formulation comprising elastomers, accelerator, antifoaming agent, antioxidant, crosslinker, colouring agent, surfactant, filler, pH adjuster and dispersing medium, wherein the elastomers are a mixture of Elastomer A and Elastomer B, wherein Elastomer A is any one selected from the group consisting of carboxylated acrylonitrile butadiene rubber (XNBR), acrylonitrile butadiene rubber (NBR) or mixtures therefrom, wherein the Elastomer B is poly(vinyl acetate/ethylene) copolymer, wherein the Elastomer A is used in an amount ranging between 1 phr to 99 phr and wherein the Elastomer B is used in an amount ranging between 1 phr to 99 phr to make up to 100 phr as total dry weight of the elastomers, wherein the accelerator is used in an amount ranging between 0.5 phr to 4.0 phr based on total dry weight of the elastomers, wherein the antifoaming agent is used in an amount ranging between 0.01 phr to 2.00 phr based on total dry weight of the elastomers, wherein the antioxidant is used in an amount ranging between 0.5 phr to 5.0 phr based on total dry weight of the elastomers, wherein the crosslinker is used in an amount ranging between 0.5 phr to 5.0 phr based on total dry weight of the elastomers, wherein the colouring agent is used in an amount ranging between 0.5 phr to 3.0 phr based on total dry weight of the elastomers, wherein the surfactant is used in an amount ranging between 0.0 phr to 5.0 phr based on total dry weight of the elastomers, wherein the filler is used in an amount ranging between 0.5 phr to 10.0 phr based on total dry weight of the elastomers and wherein the pH adjuster is used in an amount ranging between 0.5 phr to 4.0 phr based on total dry weight of the elastomers and wherein the dispersing medium is used in an amount to adjust total solid content of the elastomeric formulation to a range between 5% by weight to 40% by weight.

Also, the present invention discloses a method of preparing an elastomeric formulation to manufacture hybrid elastomeric glove, wherein the method comprises the steps of:

blending Elastomer A with Elastomer B to produce hybrid elastomer and stirring the hybrid elastomer for a duration between 2 minutes to 30 minutes until a homogeneous blend is achieved, wherein the Elastomer A is used in an amount ranging between 1 phr to 99 phr and wherein the Elastomer B is used in an amount ranging between 1 phr to 99 phr to make up to 100 phr as total dry weight of the elastomers;

adding while stirring accelerator, antifoaming agent, antioxidant, crosslinker, colouring agent, surfactant and filler one after another with no particular order and followed by pH adjuster into the hybrid elastomer to produce elastomeric formulation, wherein the elastomeric formulation comprising the accelerator in an amount ranging between 0.5 phr to 4.0 phr based on total dry weight of the elastomers, the antifoaming agent in an amount ranging between 0.01 phr to 2.00 phr based on total dry weight of the elastomers, the antioxidant in an amount ranging between 0.5 phr to 5.0 phr based on total dry weight of the elastomers, the crosslinker in an amount ranging between 0.5 phr to 5.0 phr based on total dry weight of the elastomers, the colouring agent in an amount ranging between 0.5 phr to 3.0 phr based on total dry weight of the elastomers, the surfactant in an amount ranging between 0.0 phr to 5.0 phr based on total dry weight of the elastomers, the filler in an amount ranging between 0.5 phr to 10.0 phr based on total dry weight of the elastomers and the pH adjuster in an amount ranging between 0.5 phr to 4.0 phr based on total dry weight of the elastomers; and stirring the elastomeric formulation continuously and allowing the elastomeric formulation to mature for a duration between 1 hour to 48 hours, wherein total solid content of the elastomeric formulation is adjusted to be between 5% by weight to 40% by weight by way of addition of dispersing medium into the elastomeric formulation and wherein pH range of the elastomeric formulation is adjusted to be between 9 to 11.

DETAILED DESCRIPTION OF THE INVENTION

Detailed description of preferred embodiments of the present invention is disclosed herein. It should be understood, however, that the embodiments are merely exemplary of the present invention, which may be embodied in various forms. Therefore, the details disclosed herein are not to be interpreted as limiting, but merely as the basis for the claims and for teaching one skilled in the art of the invention. The numerical data or ranges used in the specification are not to be construed as limiting.

The present invention relates to an elastomeric formulation and glove manufactured therefrom, in particular the present invention relates to an elastomeric formulation that is prepared from a blend of two elastomers which is subsequently used to prepare hybrid elastomeric product that is able to solve both the cost (i.e. in view of choice of material) and the durability issues, as well as is able to pass migration tests set by the appropriate regulatory body to qualify the usage in the food industry (which will be further detailed in the example section i.e. particularly see tables 2 to 5).

The elastomeric formulation comprises at least (a) elastomers and (b) processing additives. The processing additives include but not limited to accelerator, antifoaming agent, antioxidant, crosslinker, colouring agent, surfactant, filler, pH adjuster and dispersing medium. The elastomers are a mixture of:

any one selected from the group consisting of carboxylated acrylonitrile butadiene rubber (XNBR), acrylonitrile butadiene rubber (NBR) or mixtures therefrom, preferably XNBR. For the purpose of this invention hereinafter any elastomer selected from this group will be regarded as Elastomer A; and poly(vinyl acetate/ethylene) copolymer. The VAE consists of more vinyl acetate than ethylene, wherein the vinyl acetate is considered as major component of the copolymer and wherein the vinyl acetate makes up to more than 50% of the copolymer. For the purpose of this invention hereinafter VAE will be regarded as Elastomer B. The VAE may be replaced by thermoplastic, wherein the thermoplastic may be any one selected from the group consisting of poly(ethylene/vinyl acetate) copolymer (EVA), polyethylene, polyvinyl acetate or mixtures therefrom. The VAE may also be used in combination with any one thermoplastic or mixtures therefrom.

The Elastomer B and/or the thermoplastic are used in liquid dispersion (latex) form instead of dry form such as but not limited to the forms of pellets and/or slabs. For the purpose of this invention, the phrase "elastomers are mixture of" may also be used alternatively with "elastomers are blends of". For the purpose of this invention, the term "hybrid" signifies the presence (or mixture/blends) of both the Elastomer A and the Elastomer B in the elastomeric formulation that is subsequently used to prepare hybrid elastomeric product. The hybrid elastomeric product is an elastomeric glove. However, the hybrid elastomeric product may be extended to medical and/or non-medical application as well as any film forming applications such as but not limited to condom, exercise band and dental dam.

The accelerator is any one selected from the group consisting of tetramethylthiuram (TMTD), 2,2'-dithio-bis(benzothiazole) (MBTS), N-cyclohexylbenzothiazole-sulfinicamide (CBS), zinc diethylthiocarbamate (ZDEC), zinc dibutyldithiocarbamate (ZDBC), thiuram, carbamate or mixtures therefrom, preferably ZDEC or ZDBC. The antifoaming agent is any one selected from the group consisting of silicone based antifoaming agent, silicone free antifoaming agent or mixtures therefrom, preferably silicone free antifoaming agent. The silicone based antifoaming agent is selected from the group consisting of silicone glycols, other modified silicone fluids or mixtures therefrom. The silicone free antifoaming agent is selected from the group consisting of oil emulsion, emulsion of waxes or mixtures therefrom.

The antioxidant is any one selected from the group consisting of arylamines, polymeric hindered phenols or mixtures therefrom, preferably polymeric hindered phenols. The arylamines are selected from the group consisting of alkylated diphenylamines, p-phenylenediamines or mixtures therefrom. The polymeric hindered phenols are selected from the group consisting of butylated hindered phenol, styrenated hindered phenol or mixtures therefrom. The crosslinker is any one selected from the group consisting of sulphur, sulphur-containing compounds, zinc oxide, other metal based oxides or mixtures therefrom, preferably sulphur or zinc oxide.

The colouring agent is any one selected from the group consisting of any conventional dyes, any conventional pigments, titanium dioxide or mixtures therefrom, preferably any conventional pigments or titanium dioxide. The surfactant is any one selected from the group consisting of linear alkylbenzene sulphonates (LAS), alcohol ether sulphates (AES), secondary alkane sulphonates (SAS), alcohol sulphates or mixtures therefrom, preferably LAS. The LAS may be any one selected from the group consisting of sodium dodecylbenzenesulphonate, ammonium undecylbenzenesulphonate, potassium dodecylbenzenesulphonate or mixtures therefrom, preferably sodium dodecylbenzenesulphonate or potassium dodecylbenzenesulphonate.

The AES may be any one selected from the group consisting of sodium laureth sulphate, ammonium laureth sulphate or mixtures therefrom, preferably sodium laureth sulphate. The SAS may be any one of sodium C14 to C18 alkane sulfonate, preferably sodium 1-tetradecanesulfonate. The alcohol sulphates may be any one selected from the group consisting of sodium lauryl sulphate, ammonium lauryl sulphate, triethanolamine lauryl sulphate or mixtures therefrom, preferably sodium lauryl sulphate or ammonium lauryl sulphate.

The filler is any one selected from the group consisting of any conventional silicate based filler, any conventional calcium carbonate based filler and carbon black, preferably any conventional silicate based filler. The pH adjuster is any one selected from the group consisting of ammonia, sodium hydroxide, potassium hydroxide, ammonium hydroxide or mixtures therefrom, preferably ammonia. The dispersing medium is water.

The elastomeric formulation is prepared to manufacture hybrid elastomeric glove, wherein the method comprises the steps of:

i. blending Elastomer A (as listed above) with Elastomer B (as listed above) to produce hybrid elastomer and stirring the hybrid elastomer for a duration between 2 minutes to 30 minutes, preferably 15 minutes until a homogeneous blend is achieved, wherein the Elastomer A is used in an amount ranging between 1 phr to 99 phr, preferably in an amount ranging between 70 phr to 95 phr, still preferably in an amount of 90 phr and wherein the Elastomer B is used in an amount ranging between 1 phr to 99 phr, preferably in an amount ranging between 5 phr to 30 phr, still preferably in an amount of 10 phr respectively to make up to 100 phr which hereinafter will be considered as total dry weight of the elastomers;

ii. adding while stirring accelerator (as listed above), antifoaming agent (as listed above), antioxidant (as listed above), crosslinker (as listed above), colouring agent (as listed above), surfactant (as listed above) and filler (as listed above) one after another with no particular order and followed by pH adjuster (as listed above) into the hybrid elastomer to produce elastomeric formulation, wherein the elastomeric formulation comprising:

the accelerator in an amount ranging between 0.5 phr to 4.0 phr based on total dry weight of the elastomers, preferably between 1.0 phr to 2.0 phr based on total dry weight of the elastomers, still preferably 1.5 phr based on total dry weight of the elastomers, the antifoaming agent in an amount ranging between 0.01 phr to 2.00 phr based on total dry weight of the elastomers, preferably between 0.02 phr to 1.00 phr based on total dry weight of the elastomers, still preferably 0.03 phr based on total dry weight of the elastomers, the antioxidant in an amount ranging between 0.5 phr to 5.0 phr based on total dry weight of the elastomers, preferably between 1.0 phr to 3.0 phr based on total dry weight of the elastomers, still preferably 2.0 phr based on total dry weight of the elastomers, the crosslinker in an amount ranging between 0.5 phr to 5.0 phr based on total dry weight of the elastomers, preferably between 1.0 phr to 3.0 phr based on total dry weight of the elastomers, still preferably 1.2 phr based on total dry weight of the elastomers, the colouring agent in an amount ranging between 0.5 phr to 3.0 phr based on total dry weight of the elastomers, preferably between 1.0 phr to 2.0 phr based on total dry weight of the elastomers, still preferably 1.1 phr based on total dry weight of the elastomers, the surfactant in an amount ranging between 0.0 phr to 5.0 phr based on total dry weight of the elastomers, preferably between 0.2 phr to 2.0 phr based on total dry weight of the elastomers, still preferably 1.0 phr based on total dry weight of the elastomers, the filler in an amount ranging between 0.5 phr to 10.0 phr based on total dry weight of the elastomers, preferably between 1.0 phr to 5.0 phr based on total dry weight of the elastomers, still preferably 1.5 phr based on total dry weight of the elastomers, and the pH adjuster in an amount ranging between 0.5 phr to 4.0 phr based on total dry weight of the elastomers, preferably between 1.0 phr to 2.0 phr based on total dry weight of the elastomers, still preferably 1.5 phr based on total dry weight of the elastomers; and iii. stirring the elastomeric formulation continuously and allowing the elastomeric formulation to mature for a duration between 1 hour to 48 hours, preferably 15 hours to 30 hours, still preferably 24 hours, wherein total solid content of the elastomeric formulation is adjusted to be between 5% by weight to 40% by weight by way of addition of dispersing medium into the elastomeric formulation either before or after maturation of the elastomeric formulation and wherein pH range of the elastomeric formulation is adjusted to be between 9 to 11 prior to be used to prepare the hybrid elastomeric glove.

The present invention utilizes water (the dispersing medium) as diluent. The latter assists in achieving homogeneous blend of both the elastomers and the same is attained by way of latex blending without requirement of any external heating and/or application of pressure. For the purpose of this invention, the phrase "one after another with no particular order" signifies that any one of the chemicals may be added first and followed by the other since order of mixing is not crucial.

For the purpose of this invention, the term "hybrid" signifies presence (or mixture/blends) of both the Elastomer A and the Elastomer B in the elastomeric formulation. For the purpose of this invention, the phrase "total dry weight of the elastomers" signifies totality calculated from sum of the dry weight of the Elastomer A and the dry weight of the Elastomer B.

The hybrid elastomeric glove is prepared using elastomeric formulation as disclosed above adopting a method commonly known in the glove manufacturing industry. The method to prepare the hybrid elastomeric glove (as stated above) comprises the steps of:

i. dipping a former into a coagulant solution at a temperature between 40° C. to 65° C. for a time period ranging from 4 seconds to 30 seconds to coat a coagulant layer on the former, wherein the former is washed prior to be used in step (i) and wherein the coagulant solution is any conventional coagulant solution;

ii. drying the coagulant layer coated on the former obtained in step (i) at a temperature between 80° C. to 200° C. for a time period ranging from 1 minute to 10 minutes;

iii. dipping the former obtained in step (ii) into first latex formulation at a temperature between 20° C. to 40° C. for a time period ranging from 4 seconds to 30 seconds to produce a first latex layer, wherein the first latex layer has a total solid content of 5% by weight to 40% by weight;

iv. drying the first latex layer coated on the former obtained in step (iii) at a temperature between 80° C. to 150° C. for a time period ranging from 20 seconds to 5 minutes;

v. dipping the former obtained in step (iv) into second latex formulation at a temperature between 20° C. to 40° C. for a time period ranging from 4 seconds to 30 seconds to produce a second latex layer, wherein the second latex layer has a total solid content of 5% by weight to 40% by weight;

vi. drying the second latex layer coated on the former obtained in step (v) at a temperature between 80° C. to 200° C. for a time period ranging from 20 seconds to 5 minutes;

vii. treating the second latex layer coated on the former obtained in step (vi) with hot water at a temperature between 40° C. to 80° C. for a time period ranging from 20 seconds to 5 minutes to leach out chemical residues to form pre-leached latex film;

viii. curing the pre-leached latex film coated on the former obtained in step (vii) at a temperature between 90° C. to 150° C. for a time period ranging from 5 minutes to 45 minutes to produce latex film, wherein the latex film is made from blends of both the Elastomer A and the Elastomer B;

ix. treating the latex film coated on the former obtained in step (viii) with chlorine water at ambient temperature for a time period ranging from 10 seconds to 60 seconds to obtain treated latex film;

x. treating the treated latex film obtained in step (ix) with hot water at a temperature between 40° C. to 80° C. for a time period ranging from 20 seconds to 5 minutes to leach out chemical residues to obtain post-leached latex film;

xi. drying the post-leached latex film coated on the former obtained in step (x) at a temperature between 80° C. to 200° C. for a time period ranging from 20 seconds to 5 minutes to produce hybrid elastomeric glove; and xii. stripping the hybrid elastomeric glove obtained in step (xi) from the former; and wherein the first and second latex formulations are identical elastomeric formulation, which was discussed above.

The hybrid elastomeric glove prepared has a tensile strength ranging between 14 MPa to 40 MPa, an elongation at break ranging between 400% to 900% and durability ranging between 2 hours to 5 hours as well as is able to pass all the migration tests. Lastly, the hybrid elastomeric glove of the present invention:

i. contains no latex protein;
ii. is able to achieve mechanical properties (with up to 30% usage of Elastomer B) that are comparable to the conventional XNBR glove after aging, which will be further detailed in the example section i.e. see tables 2 and 3;
iii. is able to achieve enhanced durability (with up to 30% usage of Elastomer B) compared to the conventional XNBR glove, which will be further detailed in the example section i.e. see table 4; and
iv. is able to pass all migration tests (with up to 20% usage of Elastomer B), particularly 50% ethanol and 3% acetic acid, which will be further detailed in the example section i.e. see table 5.

The following examples are constructed to illustrate the present invention in a non-limiting sense.

Example 1

Elastomeric Formulation

Elastomeric formulation comprising:

(a) elastomers, wherein the elastomers are a mixture of Elastomer A and Elastomer B, wherein Elastomer A is any one selected from the group consisting of carboxylated acrylonitrile butadiene rubber (XNBR), acrylonitrile butadiene rubber (NBR) or mixtures therefrom, preferably XNBR, wherein the Elastomer B is poly(vinyl acetate/ethylene) copolymer, wherein the VAE consists of vinyl acetate of more than 50%, wherein the VAE may also be replaced by any one thermoplastic selected from the group consisting of poly(ethylene/vinyl acetate) copolymer (EVA), polyethylene, polyvinyl acetate or mixtures therefrom and wherein the Elastomer B and/or the thermoplastic are in liquid dispersion form;

(b) accelerator, wherein the accelerator is any one selected from the group consisting of tetramethylthiuram (TMTD), 2,2'-dithio-bis(benzothiazole) (MBTS), N-cyclohexylbenzothiazole-sulfinicamide (CBS), zinc diethylthiocarbamate (ZDEC), zinc dibutyldithiocarbamate (ZDBC), thiuram, carbamate or mixtures therefrom, preferably ZDEC or ZDBC;

(c) antifoaming agent, wherein the antifoaming agent is any one selected from the group consisting of silicone based antifoaming agent, silicone free antifoaming agent or mixtures therefrom, preferably silicone free antifoaming agent, wherein the silicone based antifoaming agent is selected from the group consisting of silicone glycols, other modified silicone fluids or mixtures therefrom and wherein the silicone free antifoaming agent is selected from the group consisting of oil emulsion, emulsion of waxes or mixtures therefrom;

(d) antioxidant, wherein the antioxidant is any one selected from the group consisting of arylamines, polymeric hindered phenols or mixtures therefrom, preferably polymeric hindered phenols, wherein the arylamines are selected from the group consisting of alkylated diphenylamines, p-phenylenediamines or mixtures therefrom and wherein the polymeric hindered phenols are selected from the group consisting of butylated hindered phenol, styrenated hindered phenol or mixtures therefrom;

(e) crosslinker, wherein the crosslinker is any one selected from the group consisting of sulphur, sulphur-containing compounds, zinc oxide, other metal based oxides or mixtures therefrom, preferably sulphur or zinc oxide;

(f) colouring agent, wherein the colouring agent is any one selected from the group consisting of any conventional dyes, any conventional pigments, titanium dioxide or mixtures therefrom, preferably any conventional pigments or titanium dioxide;

(g) surfactant, wherein the surfactant is any one selected from the group consisting of linear alkylbenzene sulphonates (LAS), alcohol ether sulphates (AES), secondary alkane sulphonates (SAS), alcohol sulphates or mixtures therefrom, preferably LAS;

(h) filler, wherein the filler is any one selected from the group consisting of any conventional silicate based filler, any conventional calcium carbonate based filler and carbon black, preferably any conventional silicate based filler;

(i) pH adjuster, wherein the pH adjuster is any one selected from the group consisting of ammonia, sodium hydroxide, potassium hydroxide, ammonium hydroxide or mixtures therefrom, preferably ammonia; and (j) dispersing medium, wherein the dispersing medium is water.

Table 1 summarizes chemical components (as listed above) used (in parts per hundred rubber, phr) in preparing the elastomeric formulation.

TABLE 1

Chemical components used to prepare the elastomeric formulation

| Chemicals | Working range (phr) | Preferred range (phr) | Dosage (phr) |
|---|---|---|---|
| Elastomer A | 1 to 99 | 70 to 95 | 90 |
| Elastomer B | 1 to 99 | 5 to 30 | 10 |
| Accelerator | 0.5 to 4.0 (based on total dry weight of the elastomers) | 1.0 to 2.0 (based on total dry weight of the elastomers) | 1.5 (based on total dry weight of the elastomers) |
| Antifoaming agent | 0.01 to 2.00 (based on total dry weight of the elastomers) | 0.02 to 1.00 (based on total dry weight of the elastomers) | 0.03 (based on total dry weight of the elastomers) |
| Antioxidant | 0.5 to 5.0 (based on total dry weight of the elastomers) | 1.0 to 3.0 (based on total dry weight of the elastomers) | 2.0 (based on total dry weight of the elastomers) |
| Crosslinker | 0.5 to 5.0 (based on total dry weight of the elastomers) | 1.0 to 3.0 (based on total dry weight of the elastomers) | 1.2 (based on total dry weight of the elastomers) |
| Colouring agent | 0.5 to 3.0 (based on total dry weight of the elastomers) | 1.0 to 2.0 (based on total dry weight of the elastomers) | 1.1 (based on total dry weight of the elastomers) |
| Surfactant | 0.0 to 5.0 (based on total dry weight of the elastomers) | 0.2 to 2.0 (based on total dry weight of the elastomers) | 1.0 (based on total dry weight of the elastomers) |
| Filler | 0.5 to 10.0 (based on total dry weight of the elastomers) | 1.0 to 5.0 (based on total dry weight of the elastomers) | 1.5 (based on total dry weight of the elastomers) |
| pH adjuster | 0.5 to 4.0 (based on total dry weight of the elastomers) | 1.0 to 2.0 (based on total dry weight of the elastomers) | 1.5 (based on total dry weight of the elastomers) |
| Dispersing medium | used at an amount to adjust total solid content of the elastomeric formulation between 5% by weight to 40% by weight | | |

For the purpose of this invention, the phrase "total dry weight of the elastomers" signifies totality calculated from sum of the dry weight of the Elastomer A and the dry weight of the Elastomer B.

Example 2

Preparation of the Elastomeric Formulation
The elastomeric formulation is prepared to manufacture hybrid elastomeric glove, wherein the method comprises the steps of:
  i. blending Elastomer A (as listed above) with Elastomer B (as listed above) to produce hybrid elastomer and stirring the hybrid elastomer for a duration between 2 minutes to 30 minutes, preferably 15 minutes until a homogeneous blend is achieved, wherein the Elastomer A is used in an amount ranging between 1 phr to 99 phr, preferably in an amount ranging between 70 phr to 95 phr, still preferably in an amount of 90 phr and wherein the Elastomer B is used in an amount ranging between 1 phr to 99 phr, preferably in an amount ranging between 5 phr to 30 phr, still preferably in an amount of 10 phr respectively to make up to 100 phr which hereinafter will be considered as total dry weight of the elastomers;
  ii. adding while stirring accelerator (as listed above), antifoaming agent (as listed above), antioxidant (as listed above), crosslinker (as listed above), colouring agent (as listed above), surfactant (as listed above) and filler (as listed above) one after another with no particular order and followed by pH adjuster (as listed above) into the hybrid elastomer to produce elastomeric formulation, wherein the elastomeric formulation comprising:
    the accelerator in an amount ranging between 0.5 phr to 4.0 phr based on total dry weight of the elastomers, preferably between 1.0 phr to 2.0 phr based on total dry weight of the elastomers, still preferably 1.5 phr based on total dry weight of the elastomers,
    the antifoaming agent in an amount ranging between 0.01 phr to 2.00 phr based on total dry weight of the elastomers, preferably between 0.02 phr to 1.00 phr based on total dry weight of the elastomers, still preferably 0.03 phr based on total dry weight of the elastomers,
    the antioxidant in an amount ranging between 0.5 phr to 5.0 phr based on total dry weight of the elastomers, preferably between 1.0 phr to 3.0 phr based on total dry weight of the elastomers, still preferably 2.0 phr based on total dry weight of the elastomers,
    the crosslinker in an amount ranging between 0.5 phr to 5.0 phr based on total dry weight of the elastomers, preferably between 1.0 phr to 3.0 phr based on total dry weight of the elastomers, still preferably 1.2 phr based on total dry weight of the elastomers,
    the colouring agent in an amount ranging between 0.5 phr to 3.0 phr based on total dry weight of the elastomers, preferably between 1.0 phr to 2.0 phr based on total dry weight of the elastomers, still preferably 1.1 phr based on total dry weight of the elastomers,
    the surfactant in an amount ranging between 0.0 phr to 5.0 phr based on total dry weight of the elastomers, preferably between 0.2 phr to 2.0 phr based on total dry weight of the elastomers, still preferably 1.0 phr based on total dry weight of the elastomers,
    the filler in an amount ranging between 0.5 phr to 10.0 phr based on total dry weight of the elastomers, preferably between 1.0 phr to 5.0 phr based on total dry weight of the elastomers, still preferably 1.5 phr based on total dry weight of the elastomers, and
    the pH adjuster in an amount ranging between 0.5 phr to 4.0 phr based on total dry weight of the elastomers, preferably between 1.0 phr to 2.0 phr based on total dry weight of the elastomers, still preferably 1.5 phr based on total dry weight of the elastomers; and
  iii. stirring the elastomeric formulation continuously and allowing the elastomeric formulation to mature for a duration between 1 hour to 48 hours, preferably 15 hours to 30 hours, still preferably 24 hours, wherein total solid content of the elastomeric formulation is adjusted to be between 5% by weight to 40% by weight by way of addition of dispersing medium into the elastomeric formulation either before or after maturation of the elastomeric formulation and wherein pH range of the elastomeric formulation is adjusted to be between 9 to 11 prior to be used to prepare the hybrid elastomeric glove.

For the purpose of this invention, the phrase "one after another with no particular order" signifies that any one of the chemicals may be added first and followed by the other since order of mixing is not crucial. For the purpose of this invention, the term "hybrid" signifies presence (or mixture/blends) of both the Elastomer A and the Elastomer B in the elastomeric formulation. For the purpose of this invention, the phrase "total dry weight of the elastomers" signifies totality calculated from sum of the dry weight of the Elastomer A and the dry weight of the Elastomer B.

Example 3

Hybrid Elastomeric Glove
Manufacturing hybrid elastomeric glove using elastomeric formulation as prepared in example 2 (using the Elastomeric Formulation from example 1) adopting method commonly known in the glove manufacturing industry.

The method to prepare the hybrid elastomeric glove (using the Elastomeric Formulation from example 1) comprises the steps of:
  i. dipping a former into a coagulant solution at a temperature between 40° C. to 65° C. for a time period ranging from 4 seconds to 30 seconds to coat a coagulant layer on the former, wherein the former is washed prior to be used in step (i) and wherein the coagulant solution is any conventional coagulant solution;
  ii. drying the coagulant layer coated on the former obtained in step (i) at a temperature between 80° C. to 200° C. for a time period ranging from 1 minute to 10 minutes;
  iii. dipping the former obtained in step (ii) into first latex formulation at a temperature between 20° C. to 40° C. for a time period ranging from 4 seconds to 30 seconds to produce a first latex layer, wherein the first latex layer has a total solid content of 5% by weight to 40% by weight;
  iv. drying the first latex layer coated on the former obtained in step (iii) at a temperature between 80° C. to 150° C. for a time period ranging from 20 seconds to 5 minutes;
  v. dipping the former obtained in step (iv) into second latex formulation at a temperature between 20° C. to 40° C. for a time period ranging from 4 seconds to 30 seconds to produce a second latex layer, wherein the second latex layer has a total solid content of 5% by weight to 40% by weight;

vi. drying the second latex layer coated on the former obtained in step (v) at a temperature between 80° C. to 200° C. for a time period ranging from 20 seconds to 5 minutes;

vii. treating the second latex layer coated on the former obtained in step (vi) with hot water at a temperature between 40° C. to 80° C. for a time period ranging from 20 seconds to 5 minutes to leach out chemical residues to form pre-leached latex film;

viii. curing the pre-leached latex film coated on the former obtained in step (vii) at a temperature between 90° C. to 150° C. for a time period ranging from 5 minutes to 45 minutes to produce latex film, wherein the latex film is made from blends of both the Elastomer A and the Elastomer B;

ix. treating the latex film coated on the former obtained in step (viii) with chlorine water at ambient temperature for a time period ranging from 10 seconds to 60 seconds to obtain treated latex film;

x. treating the treated latex film obtained in step (ix) with hot water at a temperature between 40° C. to 80° C. for a time period ranging from 20 seconds to 5 minutes to leach out chemical residues to obtain post-leached latex film;

xi. drying the post-leached latex film coated on the former obtained in step (x) at a temperature between 80° C. to 200° C. for a time period ranging from 20 seconds to 5 minutes to produce hybrid elastomeric glove; and xii. stripping the hybrid elastomeric glove obtained in step (xi) from the former; and wherein the first and second latex formulations are identical elastomeric formulation, which was discussed in example 1.

Mechanical properties (i.e. tensile strength and elongation at break) of the prepared hybrid elastomeric glove are tested according to standard method ASTM D6319. Further, the prepared hybrid elastomeric glove is tested for durability and migration. Tables 2 to 3 show comparison of the mechanical properties of the hybrid elastomeric glove prepared in the present invention and carboxylated acrylonitrile butadiene rubber (XNBR) glove prepared conventionally (as control).

TABLE 2

Tensile strength (MPa) of the hybrid elastomeric glove of the present invention and conventional XNBR glove

| **Glove samples | Tensile strength (MPa) | |
|---|---|---|
| | Before aging | *After aging |
| XNBR glove (control) | 23.72 | 26.10 |
| Hybrid elastomeric glove (XNBR:VAE = 90:10 by weight) | 21.67 | 24.09 |
| Hybrid elastomeric glove (XNBR:VAE = 80:20 by weight) | 17.64 | 19.03 |
| Hybrid elastomeric glove (XNBR:VAE = 70:30 by weight) | 14.84 | 19.60 |
| ASTM D6319 for XNBR | Minimum 14 | |

*Aging condition: Heating at a temperature of 100° C. for a period of 22 hours
**Thickness of Dumbbells (mm): 0.056 to 0.060

TABLE 3

Elongation at break (%) of the hybrid elastomeric glove of the present invention and conventional XNBR glove

| **Glove samples | Elongation at break (%) | |
|---|---|---|
| | Before aging | *After aging |
| XNBR glove (control) | 512.10 | 429.78 |
| Hybrid elastomeric glove (XNBR:VAE = 90:10 by weight) | 520.87 | 437.85 |
| Hybrid elastomeric glove (XNBR:VAE = 80:20 by weight) | 514.86 | 446.70 |
| Hybrid elastomeric glove (XNBR:VAE = 70:30 by weight) | 484.61 | 453.40 |
| ASTM D6319 for XNBR | Minimum 500 | Minimum 400 |

*Aging condition: Heating at a temperature of 100° C. for a period of 22 hours
**Thickness of Dumbbells (mm): 0.056 to 0.060

Hybrid elastomeric glove prepared using elastomeric formulation of the present invention is able to achieve comparable mechanical properties (i.e. tensile strength and elongation at break) as of the conventional XNBR glove, proving that the mechanical properties of the hybrid elastomeric glove of the present invention are not compromised.

Tables 4 and 5 show comparison of the durability and the migration test results of the hybrid elastomeric glove prepared in the present invention and carboxylated acrylonitrile butadiene rubber (XNBR) glove prepared conventionally (as control).

TABLE 4

Durability (in hours) of the hybrid elastomeric glove of the present invention and conventional XNBR glove

| Glove samples | *Durability |
|---|---|
| XNBR glove (control) | 2 hours 13 minutes |
| Hybrid elastomeric glove (XNBR:VAE = 90:10 by weight) | between 4 hours 30 minutes to 5 hours |
| Hybrid elastomeric glove (XNBR:VAE = 80:20 by weight) | between 3 hours to 3 hours 30 minutes |
| Hybrid elastomeric glove (XNBR:VAE = 70:30 by weight) | between 2 hours 30 minutes to 3 hours |

*Tested using durability tester instrument

The elastomers blending carried out in the present invention as described in the example 2 that resulted in producing a homogeneous blend directly contributed to the above attained durability. The hybrid elastomeric glove prepared using elastomeric formulation of the present invention is able to achieve enhanced durability of more than 2 hours 30 minutes, particularly more than 3 hours, more particularly more than 4 hours in comparison to the conventional XNBR glove.

TABLE 5

Outcome of the migration test for the hybrid elastomeric glove of the present invention and conventional XNBR glove

| Glove samples | *Migration test (mg/dm$^2$) | | |
|---|---|---|---|
| | Simulant B, 3% acetic acid | Simulant D1, 50% ethanol | Status |
| XNBR glove (control) | 9.80 | 6.40 | Pass |

TABLE 5-continued

Outcome of the migration test for the hybrid elastomeric glove of the present invention and conventional XNBR glove

| Glove samples | *Migration test (mg/dm$^2$) | | Status |
|---|---|---|---|
| | Simulant B, 3% acetic acid | Simulant D1, 50% ethanol | |
| Hybrid elastomeric glove (XNBR:VAE = 90:10 by weight) | 8.58 | 7.52 | Pass |
| Hybrid elastomeric glove (XNBR:VAE = 80:20 by weight) | 5.79 | 8.65 | Pass |

*Standard requirements of Regulation (EU) No. 10/2011 is ≤ 10 mg/dm$^2$
*Aging condition: Heating at a temperature of 100° C. for a period of 22 hours Other migration tests available for testing to determine if a glove is safe for food handling are such as but not limited to tests using simulant A (10% v/v ethanol), simulant C (20% v/v ethanol) and simulant D2 (vegetable oil). Based on Regulation (EU) No. 10/2011, simulants A, B and C are assigned for foods that have hydrophilic characteristics and tend to be extracted/dissolved in water. These foods are generally aqueous in nature. Simulants D1 and D2 are for foods that have lipophilic characteristics and tend to be extracted/dissolved in fats, oils and/or organic solvents (i.e. hexane and toluene).

Remark: There are no results for simulants A and C because theoretically if the glove could pass the migration test for higher concentration of ethanol (50%), lower concentrations of 10% and 20% ethanol would be easily fulfilled. Similarly, there is no result for simulant D2 because conventional XNBR glove could pass the migration test for simulant D2. Hence glove of the present invention which has XNBR as one of its components would easily satisfy the test.

As a whole, the elastomeric formulation and the hybrid elastomeric glove prepared therefrom (of the present invention) are able to overcome the conventional shortcomings since the hybrid elastomeric glove solves both the cost (i.e. in view of choice of material since VAE is cheaper than XNBR) and the durability issues (i.e. able to achieve enhanced durability of more than 4 hours in comparison to the conventional XNBR glove), as well as is able to pass all migration tests set by the European regulatory body to qualify the usage in the food industry.

Lastly, the glove of the present invention:
(i) contains no latex protein;
(ii) is able to achieve mechanical properties (with up to 30% usage of Elastomer B) that are comparable to the conventional XNBR glove after aging;
(iii) is able to achieve enhanced durability (with up to 30% usage of Elastomer B) compared to the conventional XNBR glove; and
(iv) is able to pass all migration tests (with up to 20% usage of Elastomer B), particularly the 50% ethanol and the 3% acetic acid).

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including" and "having" are inclusive and therefore specify the presence of stated features, integers, steps, operations, elements and/or components, but do not preclude the presence or addition of one or more other features, integers, steps, operations, elements, components and/or groups therefrom.

The method steps, processes and operations described herein are not to be construed as necessarily requiring their performance in the particular order discussed or illustrated, unless specifically identified as an order of performance. It is also to be understood that additional or alternative steps may be employed. The use of the expression "at least" or "at least one" suggests the use of one or more elements, as the use may be in one of the embodiments to achieve one or more of the desired objects or results.

The invention claimed is:

1. An elastomeric formulation comprising elastomers, accelerator, antifoaming agent, antioxidant, crosslinker, colouring agent, surfactant, filler, pH adjuster and dispersing medium,
    wherein the elastomers are a mixture of Elastomer A and Elastomer B,
    wherein Elastomer A is any one selected from the group consisting of carboxylated acrylonitrile butadiene rubber, acrylonitrile butadiene rubber or mixtures therefrom,
    wherein the Elastomer B is poly(vinyl acetate/ethylene) copolymer,
    wherein the poly(vinyl acetate/ethylene) copolymer comprises more than 50% vinyl acetate,
    wherein the Elastomer A is used in an amount ranging between 1 phr to 99 phr,
    wherein the Elastomer B is used in an amount ranging between 1 phr to 99 phr to make up to 100 phr as total dry weight of the elastomers,
    wherein the accelerator is used in an amount ranging between 0.5 phr to 4.0 phr based on total dry weight of the elastomers,
    wherein the antifoaming agent is used in an amount ranging between 0.01 phr to 2.00 phr based on total dry weight of the elastomers,
    wherein the antioxidant is used in an amount ranging between 0.5 phr to 5.0 phr based on total dry weight of the elastomers,
    wherein the crosslinker is used in an amount ranging between 0.5 phr to 5.0 phr based on total dry weight of the elastomers,
    wherein the colouring agent is used in an amount ranging between 0.5 phr to 3.0 phr based on total dry weight of the elastomers,
    wherein the surfactant is used in an amount ranging between 0.0 phr to 5.0 phr based on total dry weight of the elastomers,
    wherein the filler is used in an amount ranging between 0.5 phr to 10.0 phr based on total dry weight of the elastomers,
    wherein the pH adjuster is used in an amount ranging between 0.5 phr to 4.0 phr based on total dry weight of the elastomers, and
    wherein the dispersing medium is used in an amount to adjust total solid content of the elastomeric formulation to a range between 5% by weight to 40% by weight.

2. The elastomeric formulation as claimed in claim 1 wherein the Elastomer B is in liquid dispersion form.

3. The elastomeric formulation as claimed in claim 1 wherein the accelerator is any one selected from the group consisting of tetramethylthiuram, 2,2' dithio-bis(benzothiazole), N cyclohexylbenzothiazole-sulfinicamide (CBS), zinc diethylthiocarbamate, zinc dibutyldithiocarbamate, thiuram, carbamate or mixtures therefrom.

4. The elastomeric formulation as claimed in claim 1 wherein the antifoaming agent is any one selected from the group consisting of silicone based antifoaming agent, silicone free antifoaming agent or mixtures therefrom.

5. The elastomeric formulation as claimed in claim 1 wherein the antioxidant is any one selected from the group consisting of arylamines, polymeric hindered phenols or mixtures therefrom.

6. The elastomeric formulation as claimed in claim 1 wherein the crosslinker is any one selected from the group consisting of sulphur, sulphur-containing compounds, zinc oxide, other metal based oxides or mixtures therefrom.

7. The elastomeric formulation as claimed in claim 1 wherein the colouring agent is any one selected from the group consisting of any conventional dyes, any conventional pigments, titanium dioxide or mixtures therefrom.

8. The elastomeric formulation as claimed in claim 1 wherein the surfactant is any one selected from the group consisting of linear alkylbenzene sulphonates, alcohol ether sulphates, secondary alkane sulphonates, alcohol sulphates or mixtures therefrom.

9. The elastomeric formulation as claimed in claim 1 wherein the filler is any one selected from the group consisting of any conventional silicate based filler, any conventional calcium carbonate based filler and carbon black.

10. The elastomeric formulation as claimed in claim 1 wherein the pH adjuster is any one selected from the group consisting of ammonia, sodium hydroxide, potassium hydroxide, ammonium hydroxide or mixtures therefrom.

11. The elastomeric formulation as claimed in claim 1 wherein the dispersing medium is water.

12. A hybrid elastomeric glove produced using an elastomeric formulation comprising elastomers, accelerator, antifoaming agent, antioxidant, crosslinker, colouring agent, surfactant, filler, pH adjuster and dispersing medium,
   wherein the elastomers are a mixture of Elastomer A and Elastomer B,
   wherein Elastomer A is any one selected from the group consisting of carboxylated acrylonitrile butadiene rubber, acrylonitrile butadiene rubber or mixtures therefrom,
   wherein the Elastomer B is poly(vinyl acetate/ethylene) copolymer,
   wherein the poly(vinyl acetate/ethylene) copolymer comprises more than 50% vinyl acetate,
   wherein the Elastomer A is used in an amount ranging between 1 phr to 99 phr,
   wherein the Elastomer B is used in an amount ranging between 1 phr to 99 phr to make up to 100 phr as total dry weight of the elastomers,
   wherein the accelerator is used in an amount ranging between 0.5 phr to 4.0 phr based on total dry weight of the elastomers,
   wherein the antifoaming agent is used in an amount ranging between 0.01 phr to 2.00 phr based on total dry weight of the elastomers,
   wherein the antioxidant is used in an amount ranging between 0.5 phr to 5.0 phr based on total dry weight of the elastomers,
   wherein the crosslinker is used in an amount ranging between 0.5 phr to 5.0 phr based on total dry weight of the elastomers,
   wherein the colouring agent is used in an amount ranging between 0.5 phr to 3.0 phr based on total dry weight of the elastomers,
   wherein the surfactant is used in an amount ranging between 0.0 phr to 5.0 phr based on total dry weight of the elastomers,
   wherein the filler is used in an amount ranging between 0.5 phr to 10.0 phr based on total dry weight of the elastomers,
   wherein the pH adjuster is used in an amount ranging between 0.5 phr to 4.0 phr based on total dry weight of the elastomers, and
   wherein the dispersing medium is used in an amount to adjust total solid content of the elastomeric formulation to a range between 5% by weight to 40% by weight.

* * * * *